Nov. 26, 1929.　　　I. G. ZUMWALT　　　1,736,897
SELF PROPELLED RICE HARVESTER
Filed Nov. 2, 1927　　　2 Sheets-Sheet 2

INVENTOR
I. G. Zumwalt
BY
ATTORNEY

Patented Nov. 26, 1929

1,736,897

UNITED STATES PATENT OFFICE

IVY G. ZUMWALT, OF COLUSA, CALIFORNIA

SELF-PROPELLED RICE HARVESTER

Application filed November 2, 1927. Serial No. 230,475.

This invention relates to machines for harvesting rice—a crop which as is well known is grown on land which must be kept wet up until the time the grain is ripened, and consequently it is hard to harvest rice with the machinery used for the harvesting of other grains which are grown on relatively dry land.

The principal object of my invention is to provide for the efficient harvesting of rice by mounting the harvester directly in connection with a tractor of the endless track or caterpillar type, so that the harvester is supported by the tractor while at the same time it is capable of being raised and lowered relative thereto as is necessary during operations.

Since a tractor of this character may operate over soft ground without sinking in, the harvester itself is likewise prevented from possibly miring down, and harvesting operations may be quickly and efficiently carried out.

The further object of my invention is to mount the harvester in such relation to the tractor as to retain the tractor behind the harvester, or in other words, pushing the same so that the harvester operates on the grain while the latter is still in its normal upstanding condition.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
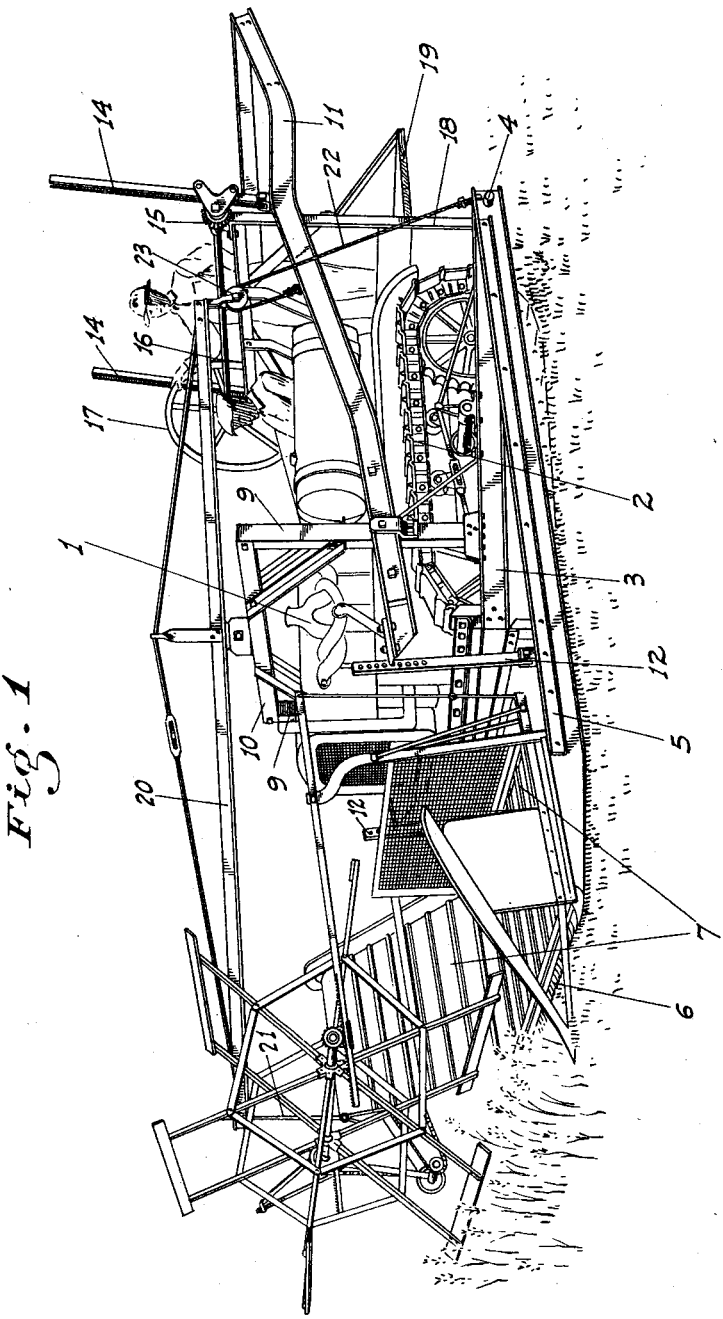
Fig. 1 is a perspective elevation of one side of the apparatus shown in its operating position.
Figure 2:
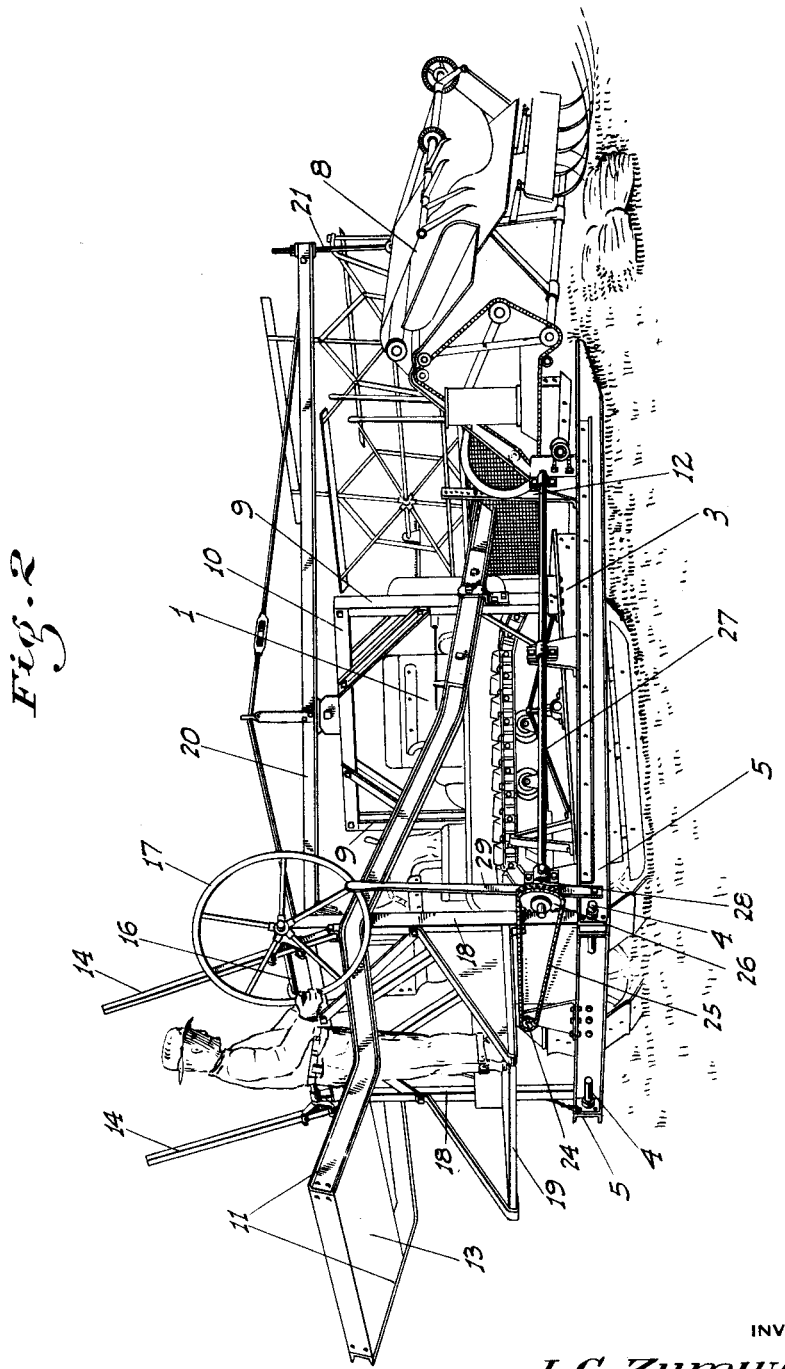
Fig. 2 is a similar view of the opposite side of the apparatus.

Referring to the numerals of reference on the drawings, the tractor 1 is of a standard type, having endless tracks 2 instead of wheels. To utilize such tractor for my purpose I surround the same by a heavy horizontal frame 3 secured thereto in a suitable manner. Pivoted on to the rear end of the frame 3 at the sides thereof as at 4 are forwardly extending beams 5. These beams project ahead of the tractor a certain distance and have mounted thereon at such forward ends a mower 6, a transverse draper 7 onto which the grain cut by the mower is disposed and a binder structure 8 disposed to one side of the mower and to which the draper delivers. This mowing and binding structure is also of standard character and of itself forms no part of my invention.

Projecting upwardly from the frame 3 intermediate its ends are posts 9 mounted and connected together to form a rigid structure by a cross beam 10 extending above the tractor. Pivoted intermediate their ends on to the outside of the posts are lift arms 11 disposed above the beam 5 and connected at their forward ends therewith by pivoted links 12. The rear ends of these arms rearwardly of the tractor are suitably connected together to form a unit and have a transverse platform 13 at such end to support a counterweight if necessary. Pivoted on and extending upwardly from the arms some distance ahead of the platform but rearwardly of the tractor are rack bars 14, which are engaged by pinions 15 mounted on a transverse shaft 16 which has a hand wheel 17 at one end. The bearings of this shaft are supported from rigid vertical posts 18 mounted on and projecting upwardly from the frame 3. To provide for the support of the operator of the hand wheel a transverse platform 19 is supported by and extends rearwardly from the posts 18, said platform being disposed so that the operator stands in the space between the arms 11, the platform 13 and the rear end of the tractor.

By means of this arrangement it will be seen that the harvester supporting arms, and consequently the harvester structure itself, may be raised and lowered at will as may be necessary.

Pivoted intermediate its ends on to the cross beam 10 is a brace beam 20 which extends diagonally of the apparatus from the binder on one side of the tractor to the arm 11 on the other side of the tractor. This beam is connected to the binder by a vertical rod 21, and to said arm 11 on the opposite side by a cable 22. This cable is connected at one end to the arm 11 and at the other end to the adjacent beam 5 passing intermediate its ends over a pulley 23 depending from the brace beam 20. This brace beam prevents the binder, which projects laterally beyond one of the side beams 5, from sagging and owing to the cable connection with the lifting arm is raised and lowered as such arms are correspondingly moved.

The binder and mower mechanisms are driven from the tractor by means of a sprocket wheel 24 which is mounted on the tractor at the rear end thereof and connected to the drive shaft of the tractor in any suitable manner. A chain 25 connects this sprocket wheel with another sprocket 26 which is mounted on a longitudinal shaft 27 which is supported by that one of the beams 5 which is on the binder side of the structure. At its forward end said shaft is operatively connected to the various mechanisms of the binder and mower to drive the same in the customary manner.

In order to permit the operation of the binder and mower to be instantly discontinued when desired a clutch structure 28, controlled by a vertical lever 29, is interposed between the shaft 27 and the sprocket wheel 26. This lever is in such a position that the operator of the tractor has almost instant control of the mower and binder, thereby eliminating possible breakage of these mechanisms in the event that an obstruction should be encountered or some part should tend to jam.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a tractor, beams pivoted on the frame of the tractor and projecting forwardly thereof, a mower structure supported by the beams ahead of the tractor, longitudinally extending arms above said beams, means mounted on the tractor frame for pivotally supporting said arms intermediate their ends, means connecting said arms at one end with the beams, and means mounted on the tractor and applied to the other end of both arms for raising and lowering the same.

2. In combination with a tractor having a frame, longitudinal beams pivoted at their rear ends onto the frame, said beams being outside the tractor and projecting ahead of the same, a mower supported by the beams at their forward ends, posts projecting upwardly from the frame intermediate its ends, longitudinal arms pivoted intermediate their ends onto said posts above the beams, connection means between the arms at their forward ends and the beams, and means applied to the arms rearwardly of their pivots for raising and lowering the same.

3. In combination with a tractor having a frame, longitudinal beams pivoted at their rear ends onto the frame, said beams being outside the tractor and projecting ahead of the same, a mower supported by the beams at their forward ends, a binder also supported by one of said beams and projecting laterally and outwardly therefrom, a brace beam above said first named beams and connected at its forward end to the binder, means for pivotally supporting said brace beam intermediate its ends from the frame, means for raising and lowering said beams, and means causing said brace beam to be likewise raised and lowered.

4. A structure as in claim 1, in which said last named means comprises rack bars pivoted on and projecting upwardly from said arms, pinions engaging the racks, and a common hand-turned shaft for the pinions journaled in fixed connection with the tractor.

5. A structure as in claim 3, in which the brace beam extends diagonally of the tractor so that its rear end is in vertical alinement with one of the arms, and said last named means includes a flexible connection between said brace beam rearwardly of its pivot and the corresponding arm rearwardly of its pivot.

6. In combination with a tractor, a frame secured to and surrounding the same, longitudinal beams pivoted at their rear ends onto the frame adjacent its rear end and extending thence forwardly and outside the frame to a point ahead of the tractor, a harvesting structure supported by the beams ahead of the tractor, posts projecting upwardly from the frame, a cross member connecting the upper ends of the posts above the tractor, longitudinal arms pivoted intermediate their ends on the posts above the beams, links connecting the forward ends of the arms with the adjacent portions of the beams, a brace beam pivoted intermediate its ends on said cross member and extending diagonally of the tractor to a connection at its forward end with the harvesting structure and to a connection at its rear end with one of said arms rearwardly of its pivot, and means applied to the rear ends of the arms for raising and lowering the same.

In testimony whereof I affix my signature.

IVY G. ZUMWALT.